United States Patent [19]

Hosking

[11] Patent Number: 4,877,119

[45] Date of Patent: Oct. 31, 1989

[54] DRINKING-BEAKER ASSEMBLY

[76] Inventor: Jeannette T. Hosking, 2927 N. 73rd St., Kansas City, Kans. 66109

[21] Appl. No.: 326,379

[22] Filed: Mar. 21, 1989

[51] Int. Cl.⁴ .................................................. B65D 25/20
[52] U.S. Cl. ..................................... 206/459; 40/306; 116/227; 116/317; 206/534
[58] Field of Search .................. 206/459, 534; 40/310, 40/324, 306; 215/365, DIG. 7; 116/227, 309, 317, DIG. 41; 229/1.5 B

[56] References Cited

U.S. PATENT DOCUMENTS

| | | | |
|---|---|---|---|
| 261,131 | 7/1882 | Bonshire | 116/309 |
| 493,851 | 3/1893 | Adsit | 116/308 |
| 675,364 | 5/1901 | Burton | 116/308 |
| 1,616,057 | 2/1927 | Merrill | 40/324 |
| 1,980,844 | 11/1934 | Ball | 116/317 |
| 2,066,183 | 12/1936 | Mehaffey | 116/308 |
| 2,111,637 | 3/1938 | Mehaffey | 116/308 |
| 2,450,949 | 10/1948 | Gattuccio et al. | 116/121 |
| 2,587,147 | 2/1952 | Guion et al. | 116/308 |
| 2,739,564 | 3/1956 | North | 116/121 |
| 2,767,680 | 10/1956 | Lermer | 116/121 |
| 2,921,707 | 1/1960 | Sloan | 215/DIG. 7 |
| 3,139,064 | 6/1964 | Harle | 116/114 |
| 3,574,957 | 4/1971 | Bello-Bridick | 40/324 |
| 3,818,858 | 6/1974 | Kramer | 116/133 |
| 3,996,879 | 12/1976 | Walton | 206/534 |
| 4,207,982 | 6/1980 | Maxwell et al. | 206/534 |
| 4,345,541 | 8/1982 | Villa-Real | 206/459 |
| 4,405,045 | 9/1983 | Villa-Real | 206/534 |
| 4,482,068 | 11/1984 | Agbay et al. | 116/309 |
| 4,548,157 | 10/1985 | Huyoyan | 206/459 |
| 4,557,215 | 12/1985 | Petersson | 116/317 |
| 4,621,670 | 11/1986 | Yuen | 206/459 |
| 4,705,182 | 11/1987 | Newel-Lewis | 206/534 |
| 4,713,900 | 12/1987 | Calloway et al. | 40/324 |

FOREIGN PATENT DOCUMENTS

| | | | |
|---|---|---|---|
| 1043722 | 11/1953 | France | 40/324 |
| 66116 | 5/1956 | France | 116/309 |
| 1070665 | 6/1967 | United Kingdom | 206/459 |

Primary Examiner—Gary Elkins
Attorney, Agent, or Firm—Hovey, Williams, Timmons & Collins

[57] ABSTRACT

An improved drinking-beaker assembly is provided which serves as both a drinking vessel, especially the drinking of water in the course of a diet, and a device for determining the precise amount of liquid consumed. The assembly preferably includes a beaker, a snap-ring collar, indicia for the number of uses and indicia for the volume level within the beaker. The beaker has a base, a wall and an open top. Portions of the wall define an annular groove having an upper rib, a bight and a lower rib. The collar is snugly fitted within the groove for manual, axial rotation of the collar relative to the beaker. The collar further includes a window which is aligned with the use indicia to sequentially indicate the number of consumptive uses of the assembly. The user may fill the beaker to the level of the volume indicia, consume the liquid from the beaker and then rotate the collar with resepct to the beaker so that the window exclusively displays the number of the indicia means associated with the use so that the total volume of liquid consumed is known.

10 Claims, 1 Drawing Sheet

U.S. Patent      Oct. 31, 1989      4,877,119
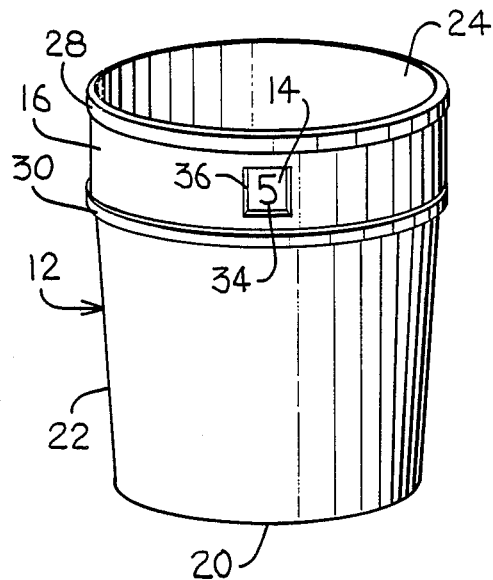
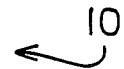
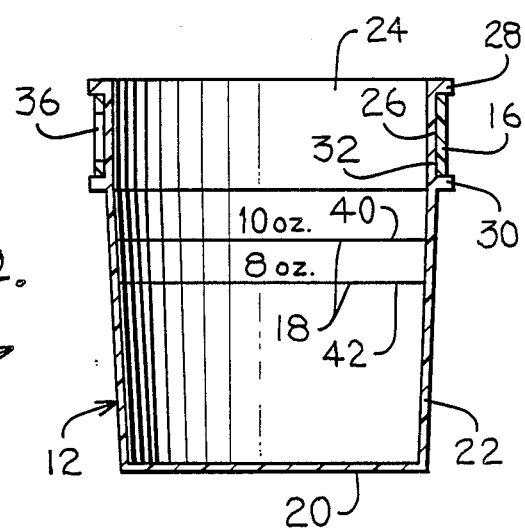
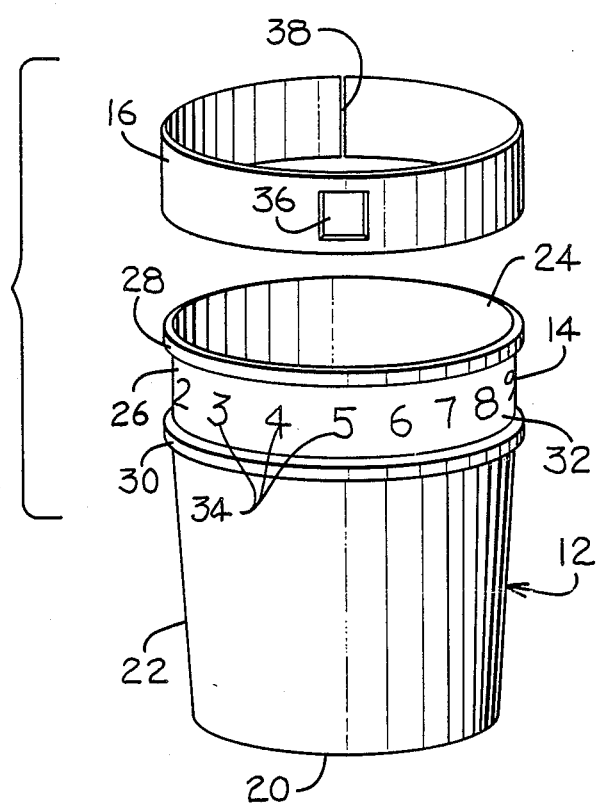
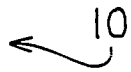

DRINKING-BEAKER ASSEMBLY

BACKGROUND OF THE INVENTION

1. Field of the Invention

This invention relates to a drinking-beaker assembly for drinking liquids and monitoring the amount of liquid consumed, especially with regard to the consumption of water in the course of a diet. More particularly it is concerned with a drinking-beaker assembly having a beaker, use-indicia structure, and a split-ring collar forming a window which is cooperatively alignable with portions of the use-indicia having a sequentially appropriate number associated with the consumptive use of the assembly.

2. Description of the Prior Art

Obesity is a major problem in the United States today. Heart attack, high blood pressure, diabetes are but a few of the serious health impacts associated with obesity. Overweight people also experience pyschological and emotional stigmata as a result of their condition. The ability to engage in physical activity as well as career success can also be adversely affected by this widespread problem. Responsible dieting is the most direct way of alleviating many of these problems and has therefore become a highly publicized topic.

There is now a wide consensus that drinking adequate amounts of water is a big factor in successful and responsible dieting. It is further widely held that most overweight people don't drink enough water. Therefore the most effective and responsible forms of dietary intervention should include a structured program for water consumption therewith. The standard contemporary formula is that the dieting person, and indeed every person, should drink eight eight-ounce glasses of water in the course of a day. Another common volume suggested for obese people is eight ten-ounce glasses of water per day.

Unfortunately, the most widespread practice by dieters seeking to practice this formula is to measure eight ounces in a separate vessel, such as a measuring cup, pour the measured volume into a drinking glass, consume the water and then record the event on paper. Another common practice is to obtain a drinking glass wherein the desired volume level is readily recognizable due to the contour of the glass or some distinctive insignia thereon. Another common practice is simply to estimate the volume in a plain drinking glass. All such methods still require graphically recording each consumptive event or alternatively, relaying on memory. Such multi-step procedures obviously allow for the greater possibility of mistake while also making the process inconvenient and time consuming.

A drinking vessel is needed which provides integral apparatus for recordation of each consumptive event without having to rely on writing or memory. Additionally, if precise volumes were indicated within the interior of the vessel, a predetermined volume of water could be consumed during the course of the day without reliance on apparatus other than the vessel itself.

While no drinking vessels solve the above stated problems, a number of pill dispensers and food containers have employed indicia for sequentially numbering various events. Patents illustrating these prior units include U.S. Pat. Nos. 2,767,680; 3,996,879; 4,405,045; 3,574,957; 4,548,157; 4,713,900; 4,482,068; 4,705,182; 2,066,183; 2,111,637; 2,450,949; 3,139,064; 4,345,541; 2,587,147; 2,739,564; 3,818,858; 4,207,982; 4,621,670; 493,851; 675,364.

SUMMARY OF THE INVENTION

The problems outlined above are solved by the drinking-beaker assembly in accordance with the present invention. That is to say, the assembly hereof serves as a drinking vessel, provides integral apparatus for recording the number of consumptive uses of the vessel and further allows the user to determine the total volume of the liquid consumed.

The drinking-beaker assembly in accordance with the present invention broadly includes a beaker presenting a horizontal base, upright wall structure extending upwardly therefrom, and a wide-mouthed open top on upper portions thereof. Exterior portions of the wall structure define an annular groove including an upper rib, a lower rib and a bight connecting the ribs. The assembly further includes use-indicia structure adjacent the bight, and an annular, split-ring collar which is axially rotatable relative to the beaker, along and within the groove. The collar includes a window, which when cooperatively aligned with the use-indicia structure, exclusively displays portions of the use-indicia means having a sequentially appropriate number associated with the consumptive use of the assembly. Thus the user is able to determine how many times he has used the assembly within a predetermined time period.

In particularly preferred forms, volume indicating structure is provided within the interior of the beaker so as to indicate a volume level so that the user may fill the beaker to a precise volume and therefore cooperatively use the volume-indicia structure with the rotatable collar and use-indicia structure to determine the total volume of liquid consumed.

BRIEF DESCRIPTION OF THE DRAWING

FIG. 1 is a perspective view of the drinking-beaker assembly in accordance with the present invention;

FIG. 2 is a cross-sectional view of the assembly;

FIG. 3 is an exploded view of the assembly.

DESCRIPTION OF THE PREFERRED EMBODIMENT

Referring to the drawing in general, and FIG. 3 in particular, a drinking-beaker assembly 10 in accordance with the present invention broadly includes a beaker 12, use-indicia structure 14, an opaque, resilient, annular split-ring collar 16 and volume-indicia structure 18 (shown in FIG. 2).

In more detail, assembly 10 is constructed of a lightweight synthetic resin material although other materials, such as lightweight metal or wood can also be used. Beaker 12 includes a base 20, a substantially upright wall structure 22 defining a wide-mouthed, open top 24. Certain portions of the wall 22 define an annular groove 26 exterior thereto.

The groove 26 includes an upper rib 28, a lower rib 30 and a bight 32 connecting the ribs. Upper rib 28 and lower rib 30 are substantially parallel and extend substantially radially from the wall 22. Use-indicia structure 14 is disposed adjacent the bight 32 and includes the digits 34 arranged in the sequence zero through nine thereon.

Collar 16 is complementally configured with said groove and snugly disposed therein. Collar 16 is axially rotatable relative to the beaker 12 along and within the groove 26. Square window 36 is formed in collar 16 and opposite thereto a thin slit 38 is formed. Other aesthetically pleasing window shapes can be used such as a circle, diamond or heart. The inner diameter of collar 16 can present serrations (not shown) and bight 32 may present detents for a purpose described hereinbelow.

Referring to FIG. 2, an eight-ounce level 40 and a ten-ounce level 42 are depicted in the interior of the beaker 12. Beaker 12 has a volume of sixteen ounces and level 40 indicates a volume of eight ounces between the base 20 and level 40 while level 42 indicates a volume of ten ounces between base 20 and level 42. The purpose of the levels will be discussed hereinbelow.

In one type of operation, the user fills the interior of beaker 12 with a desired amount of potable liquid (the desire amount can be to any level within the beaker, whether precise or approximate is not material in this context). He then consumes the liquid and this process is denominated a "consumptive event." He then axially rotates collar 16 relative to beaker 12 a sufficient distance to align window 36 with portions of the use-indica structure 14 having the sequentially appropriate number associated with the consumptive use.

Referring to FIG. 1, depicted is the assembly in the hypothetical situation where the user has just completed the fifth consumptive event (i.e., he has filled beaker 12 with liquid for the fifth time during a predetermined period of time) and has completed use of the assembly 10 by rotating collar 16 to align window 36 with the digit 34, namely the number five. Just prior to the rotation, the number four was displayed in window 36 and therefore the user knew to sequentially rotate window 36 until the number five was displayed.

The snap-ring collar 16 is manufactured as a separate piece from beaker 12 and then assembled at the factory by slightly distending collar 16 (the collar 16 is able to yield due to slit 38). Collar 16 is then positioned about groove 26, the distending pressure is released and the collar 16 therefore becomes snugly disposed in groove 26. Collar 16 is resilient for this manufacturing purpose and the inner diameter is designed so that collar 16 frictionally engages bight 32 so that collar 16 will not rotate relative to beaker 12 without a reasonably sufficient manual pressure. Serrations presented at the inner diameter of collar 16 (not shown) and detents (not shown) on bight 32 can also be incorporated into the present invention in order to enhance the frictional characteristics of the rotation and can also be used to allow certain discrete positions. For example, the window could be moved from one discrete position centered on the digit four 34 and then would not be able to "lock in" to another discrete position until it came to be centered on the digit five 34, the rest of the discrete positions being associated with each of the digits 34 in a similar fashion.

In a second type of use which is a particularly preferred form, the user can drink predetermined volumes of potable liquid by utilizing the volume-indicia structure 18. By way of example, assume that the user intends to drink sixty-four ounces of water in one day, broken down into eight eight-ounce glasses. Thus the predetermined volume of liquid to be consumed is sixty-four ounces and the predetermined time period is one day. The user would begin the use by first filling the beaker 12 up to the eight-ounce level 40, drinking the water and then rotating collar 16 until window 36 was aligned with the first digit 34, namely the number one. Sometime later, the user would repeat the procedure of filling beaker 12 to the eight-ounce level 40 drinking the water and then rotating collar 16 until window 36 was aligned with the second digit 34, namely the number two. The user would repeat this procedure until the eighth consumptive event had been completed and the window aligned with the eighth digit 34, being the number eight. At this time, the user would then know he had completed his objective of drinking sixty-four ounces of water within that predetermined period of time, namely one day.

In addition, the user would have the added benefit of knowing throughout the day what portion of his goal he had accomplished. For example, at some point in the day when he had completed three consumptive events he would look at the display window, seeing the third digit 34 displayed, namely the number three, he would know that he had drunk twenty-four ounces of water (three consumptive events times eight ounces). Thus the user knows at all times during the day the current total volume of liquid consumed.

I claim:

1. A drinking-beaker assembly for use in the consumption of desired amounts of potable liquid within a predetermined time period by a user, the assembly comprising:

a beaker presenting a substantially horizontal base, an upright wall structure extending upwardly therefrom, upper portions of said wall structure defining a wide-mouthed, open top, certain portions of said wall defining an annular groove on the exterior of said wall structure, including an upper rib and a lower rib, said ribs being substantially parallel and extending substantially radially from the exterior of said wall structure, said groove further presenting a bight connecting said ribs;

use-indicia means, including portions adjacent said bight, for sequentially indicating the number of consumptive uses of said assembly by said user within a predetermined time period; and an opaque resilient, annular, split-ring collar, complementally configured with said groove and snugly disposed therein, said collar being axially rotatable relative to said beaker along and within said groove, and certain portions of said collar forming a window, cooperatively aligned with said use-indicia means, for selectively exclusively displaying portions of said use-indicia means having a sequentially appropriate number, thus allowing the user, with each consumptive use to rotate said collar with respect to said beaker sufficiently to align said window with portions of said use-indicia means having the sequentially appropriate number associated with such consumptive use and thereby exclusively displaying the total number of consumptive uses of said assembly.

2. The drinking-beaker assembly of claim 1, wherein the shape of said window is square.

3. The drinking-beaker assembly of claim 1, wherein said use-indicia means includes the digits zero through nine sequentially arranged on said bight of said groove, and in circumscribable relationship to the beaker wall.

4. The drinking-beaker assembly of claim 3, wherein said digits are printed on said bight of said groove.

5. A drinking-beaker assembly for use in the consumption of a predetermined volume of potable liquid within a predetermined time period by a user, the assembly comprising:

a beaker presenting a substantially horizontal base, an upright wall structure extending upwardly therefrom, upper portions of said wall structure defining a wide-mouthed, open top, certain portions of said wall defining an annular groove on the exterior of said wall structure, including an upper rib and a lower rib, said ribs being substantially parallel and extending substantially radially from the exterior of said wall structure, said groove further presenting a bight connecting said ribs;

use-indicia means, including portions adjacent said bight, for sequentially indicating the number of consumptive uses of said assembly by said user within a predetermined time period;

an opaque, resilient, annular, split-ring collar, complementally configured with said groove and snugly disposed therein, said collar being axially rotatable relative to said beaker along and within said groove, and certain portions of said collar forming a window, cooperatively aligned with said use-indicia means, for selectively exclusively displaying portions of said use-indicia means having a sequentially appropriate number; and volume-indicia means, on the interior of said wall structure and coupled for indicating at least one level within said beaker, so that a precise volume within said beaker is defined between said volume-indicia means and said base, said precise volume being associated with the predetermined volume of potable liquid, thus allowing the user to fill said beaker to said level with and consume said potable liquid and rotate said collar with respect to said beaker sufficiently to align said window with protions of said assembly so that the user knows the total volume of potable liquid consumed.

6. The drinking-beaker assembly of claim 5, wherein the shape of said window is square.

7. The drinking-beaker assembly of claim 5, wherein said use-indicia means includes the digits zero throught nine sequentially arranged on said bight of said groove.

8. The drinking-beaker assembly of claim 7, wherein said digits are printed on said bight of said groove.

9. The drinking-beaker assembly of claim 5, wherein said volume-indicia means includes an annular line at a level defining a volume of eight ounces between said base and said level.

10. The drinking-beaker assembly of claim 9, wherein said volume-indicia means further includes an annular line at a level defining a volume of ten ounces between said base and said level.

* * * * *